US005926820A

United States Patent [19]
Agrawal et al.

[11] Patent Number: 5,926,820
[45] Date of Patent: Jul. 20, 1999

[54] METHOD AND SYSTEM FOR PERFORMING RANGE MAX/MIN QUERIES ON A DATA CUBE

[75] Inventors: Rakesh Agrawal; Ching-Tien Ho, both of San Jose; Nimrod Megiddo, Palo Alto, all of Calif.

[73] Assignee: International Business Machines Corporation, Armonk, N.Y.

[21] Appl. No.: 08/808,046

[22] Filed: Feb. 27, 1997

[51] Int. Cl.$^6$ .................................................. G06F 17/30
[52] U.S. Cl. ................................................. 707/200; 707/5
[58] Field of Search ................................. 707/1, 2, 3, 4, 707/5, 6, 200, 503, 504

[56] References Cited

U.S. PATENT DOCUMENTS

| | | | |
|---|---|---|---|
| 5,257,365 | 10/1993 | Powers et al. | 395/600 |
| 5,359,724 | 10/1994 | Earle | 395/425 |
| 5,404,512 | 4/1995 | Powers et al. | 395/600 |
| 5,404,513 | 4/1995 | Powers et al. | 395/600 |
| 5,442,784 | 8/1995 | Powers et al. | 395/600 |
| 5,572,644 | 11/1996 | Liaw et al. | 395/793 |
| 5,592,666 | 1/1997 | Perez | 395/600 |
| 5,647,058 | 7/1997 | Agrawal et al. | 395/601 |
| 5,701,467 | 12/1997 | Freeston | 395/611 |
| 5,745,894 | 4/1998 | Burrows et al. | 707/5 |
| 5,758,353 | 5/1998 | Marguis | 707/201 |
| 5,761,529 | 6/1998 | Raji et al. | 395/824 |
| 5,799,300 | 8/1998 | Agrawal et al. | 707/5 |

OTHER PUBLICATIONS

S. Agarwal et al., On the computation of multidimentional aggregates. In Proc. of the 22nd Int'l Conference on Very Large Databases, pp. 506–521, Mumbai (Bombay), India, Sep. 1996.

J. L. Bentley, Multidimensional divide and conquer. Comm. ACM, 23(4):214–229, 1980.

L. G. Mitten, Branch–and–Bound Methods: General Formulation and Properties, University of British Columbia, Vancouver, Canada, (Received Nov. 12, 1968).

A. Gupta et al., Aggregate–query processing in data warehouse environments. In Proceedings of the 21st VLDB Conference, pp. 358–369, Zurich, Switzerland, Sep. 1995.

B. Chazelle, Lower bounds for orthogonal range searching: II. the arithmetic model. J. ACM, 37(3):439–463, Jul. 1990.

E. F. Codd, Providing OLAP (on–line analytical processing) to user analysis: An IT mandate. Technical report, E. F. Codd and Associates, 1993.

D. Comer, The ubiquitous B–tree. ACM Computing Surveys, 11(2):121–138, Jun. 1979.

B. Chazelle et al., Computing partial sums in multidimensional arrays. In Proc. of the ACM Symp. on Computational Geometry, pp. 131–139, 1989.

S. Chaudhuri et al., Including group–by in query optimization. In Proc. of the 20th Int'l Conference on Very Large Databases, pp. 354–366, Santiago, Chile, Sep. 1994.

(List continued on next page.)

*Primary Examiner*—Paul V. Kulik
*Assistant Examiner*—Michael J. Wallace, Jr.
*Attorney, Agent, or Firm*—Khanh Q. Tran

[57] ABSTRACT

A method for performing a range max/min query in a database, in which the data is represented as a multi-dimensional data cube, is disclosed. The method comprises the steps of: partitioning the data cube into multi-level multi-dimensional blocks which are represented by a tree structure; determining the index to the maximum or minimum value for each block; generating a range max/min result from the values of the cells selected from the cells in the query region Q, and the cells referenced by the indexes at the nodes corresponding to the cells in the query region Q, using the tree structure and determined cell indexes. A branch-and-bound method is used to repeatedly reduce the size of the query region from a cell within the region, based on sub-trees whose roots are cells in the region. To further improve the method performance, one or more reference arrays may also be used to quickly traverse the tree in determining the max/min cell indexes.

36 Claims, 6 Drawing Sheets

OTHER PUBLICATIONS

J. Gray et al., Data Cube: A relational aggregation operator generalizing group–by, cross–tabs and sub–totals. In Proc. of the 12th Int'l Conference on Data Engineering, pp. 152–159, 1996. (also published as a Microsoft Technical Report, as submitted herewith.

V. Harinarayan et al., Implementing data cubes efficiently. In Proc. of the ACM SIGMOD Conference on Management of Data, Jun. 1996.

J. K. Jain et al., Algorithms for clustering data. Prentice Hall, pp. 55–142 1988.

J. Shafer et al., SPRINT: A scalable parallel classifier for data mining. In Proc. of the 22nd Int'l Conference on Very Large Databases, Bombay, India, Sep. 1996.

A. Shukla et al., Storage estimation for multidimensional aggregates in the presence of hierarchies. In Proc. of the 22nd Int'l Conference on Very Large Databases, pp. 522–531, Mumbai (Bombay), India, Sep. 1996.

J. Srivastava et al., TBSAM: An access method for efficient processing of statistical queries. IEEE Transactions on Knowledge and Data Engineering, 1(4), 1989.

P. M. Vaidya, Space–time tradeoffs for orthogonal range queries. In Proc. 17th Annual ACM Symp. on Theory of Comput., pp. 169–174, 1985.

D. E. Willard et al., Adding range restriction capability to dynamic data structures. J. ACM, 32(3):597–617, 1985.

A. Yao, On the complexity of maintaining partial sums. SIAM J. Computing, 14(2):277–288, May 1985.

METHOD AND SYSTEM FOR PERFORMING RANGE MAX/MIN QUERIES ON A DATA CUBE

FIELD OF THE INVENTION

The present invention relates to computer databases, and in particular to a method and system for performing range-maximum or range-minimum queries in a database in which data is represented as a multi-dimensional data cube.

BACKGROUND OF THE INVENTION

On-Line Analytical Processing (OLAP) has recently emerged as an important business application of databases in which an user may analyze aggregate databases built from data warehouses. The output from this analysis may then be used for synthesizing new data or extracting useful patterns from the database, such as those in data mining applications. An increasingly popular data model for OLAP applications is the multi-dimensional database (MDDB), also known as data cube. The data cube model is described, for example, by J. Gray et al. in "*Data Cube: A Relational Aggregate Operator Generalizing Group-bys, Cross-tabs and Sub-totals,*"Proc. of the 12th Int'l Conf. On Data Engineering, pp. 152–159, 1996.

To build an MDDB from a data warehouse, certain attributes (typically from 5 to 10) of the data records are first selected. Each data record of the MDDB contains a value for each of the data attributes. One of these attributes is chosen as a metric of interest and referred to as a measure attribute. The remaining attributes, say d of them, are referred to as functional attributes which are the dimensions of the data cube. The measure attribute values of all the records having the same combination of functional attributes are combined (e.g. summed up) into a single value. Functionally, an MDDB can be viewed as a d-dimensional array, indexed by the values of the d functional attributes, whose cells contain the values of the measure attribute for the corresponding combination of the functional attribute values.

For example, a data cube representing data for an insurance company may have four dimensions corresponding to the functional attributes age, year, state, and (insurance) type, respectively. Assuming that the domain of age is from 1 to 100, of year is from 1985 to 1996, of state is the 50 states in U.S., and of type is the set {home, auto, health} representing the type of insurance purchased by a customer. The data cube thus has 100×12×50×3 cells, with each cell containing the total revenue (the measure attribute in this case) for the corresponding combination of age, year, state, and type attribute values.

Furthermore, the above data cube may be extended by augmenting the domain of each functional attribute with an additional value, denoted by "all", to store the values of the measure attribute in all of the cells along that functional attribute. In the above example, the data cube will be extended to include 101×13×51×4 cells. With this extension to the cube, any query of (age, year, state, type), where the queried value for each attribute is either a single value in its domain or all, can be answered by accessing a single cell in the extended data cube. For instance, the total amount of revenue for the auto insurance in the whole U.S. in 1995 is a query specified by (all, 1995, all, auto), which can be answered in one cell access. Such queries are referred to as singleton queries.

An important class of queries in multi-dimensional databases involves the aggregation of a group of the cells selected from the data cube, where the values of interest are the maximum or minimum over selected ranges in the domains of some functional attributes. These are collectively referred to as range max/min queries, and are frequently used for numeric attributes with natural semantics in ordering, such as age, time, salary, etc. The specified ranges of the attribute domains are contiguous, and may or may not include the entire domains. For example, consider the same insurance data cube above, a typical range-max query on the cube may be for finding the maximum revenue from customers in the age group from 37 to 52, in a year range from 1988 to 1996, in all states of the U.S., and with auto insurance type. To answer this query, we can use precomputed values for "all" in the state domain. However, since the query specifies 16 (but not all) different values in the age domain, and 9 (but not all) different values in the year domain, one needs to access 16×9×1×1 cells in the extended data cube to determine the maximum among the respective aggregate values. In an interactive application of the data cube, which is the predominant OLAP environment, almost instantaneous response is of paramount importance. It is thus desirable to have a system with a generally constant response time, rather than one in which the response time depends on the volume of the portion of the data cube circumscribed by the query.

In the assignee's pending patent application Ser. No. 08/624,283, a method is described for computing multi-dimensional aggregates across many sets of dimensions, and in particular, the Group-By operators on a set of attributes of the data represented by a data cube. The described method comprises the steps of: (i) generating an operator representing possible Group-By operations on the attributes and hierarchies of possible Group-By operations, using an optimization technique; (ii) computing a first Group-By operation on a first subset of the attributes using the operator; and (iii) computing a second Group-By operation on a second subset of the attributes using the operator, based on the results of the first Group-By computation. Another query method based on Group-By operators is described by S. Chaudhuri et al. in "*Including Group-By In Query Optimization,*" Proc. of the 20th Int'l Conf. on Very Large Databases, pp. 354–366, Chile, 1994. Although such methods are useful in performing querries where Group-By operations on the data attributes are possible, they are not suitable for answering the range max/min queries where no such operators are available.

In another pending application of the assignee, which was filed on Dec. 12, 1996, a method is described for performing a range-sum query in a database represented as a multi-dimensional data cube. The method comprises the steps of selecting a subset of the data cube dimensions, computing a set of prefix-sums along the selected dimensions using the aggregate values, and generating a range-sum based on the computed prefix-sums. The prefix-sums are based on an aggregate binary operator for which an inverse aggregate binary operator exists to achieve the desired performance efficiency. However, there are no inverse operations in the case of a range max/min query that satisfy such a property. Therefore, the above-described method for performing range-sum queries can not be applied to range-max and range-min queries.

In the paper "*Implementing Data Cubes Efficiently,*" Proc. of the ACM SIGMOD Conf. on Management of Data, June 1996, V. Harinarayan et al. describe techniques for efficiently constructing a data cube by determining what subset of the data cube to pre-compute in answering a singleton query. Although these techniques can be used to perform singleton queries, they are not suitable in the case of range max/min queries where a range of cells in the data cube must be examined.

Other prior art addressed the size of the system storage required for performing multi-dimensional aggregate operations, such as the method described by A. Shukla et al. in "Storage Estimation For Multi-dimensional Aggregates In The Presence of Hierarchies," Proc. of the 22nd Int'l Conf. on Very Large Databases, pp. 522–531, India, 1996. However, the method there focuses on estimating the size of a multi-dimensional aggregate, rather than for computing a range-maximum or a range-minimum over multiple dimensions of the data cube.

Still other methods for processing multi-dimensional aggregates are described by J. Srivastava et al. ("TBSAM: An Access Method for Efficient Processing of Statistical Queries," IEEE Transaction on Knowledge and Data Engineering, 1(4), 1989) and by Z. Michalewicz ("Statistical and Scientific Databases," a text book, Ellis Horwood, 1992). These methods, however, are designed for indexing the pre-computed aggregates or for incrementally maintaining them, but not for efficiently performing the aggregate operations over ranges of the multiple dimensions.

Finally, in the field of computational geometry, there is extensive literature on efficient algorithms for handling various types of range queries. See, for example, "Computing Partial Sums In Multidimensional Arrays," Proc. of the ACM Symposium on Computational Geometry, pp. 131–139, 1989. Most of these algorithms share the following properties: first, the space overhead (e.g., system storage) is mostly non-linear in m, i.e., $O(m \log^{d-1} m)$, where m is the number of data points in the data cube. Second, the index domain of each dimension is usually assumed to be unbounded. Finally, for most of these algorithms, only the worst-case space and time trade-offs are considered, rather than those for the average case.

Therefore, there remains a need for an efficient method for performing range max/min queries in a database in which data is represented as a multi-dimensional data cube. The method allows queries that specify ranges over multiple attribute dimensions to be processed quickly in the average case, has a bounded index domain for each dimension and a space overhead which is linear or sub-linear in the number of data points m.

SUMMARY OF THE INVENTION

It is an object of the present invention to provide an efficient method for performing range-maximum or range-minimum (range max/min) queries on a d-dimensional data cube representing data in an OLAP system by decomposing the data cube into a multiple-level structure of multi-dimensional blocks (or hypercubes). Each block represents a region of the data cube and together the blocks represent the whole data cube. This decomposition of the cube allows the regions required for answering a query to be identified and examined more efficiently.

It is another object of the present invention to provide a range max/min query method that minimizes the response time and required system storage space by determining the location of the minimum (or maximum) value in each block and storing the index to this value in a corresponding block of a tree structure. The range max/min query thus can be quickly performed by simply traversing the nodes of the tree structure.

It is a further object of the invention to improve the performance of a range max/min query method by using a branch-and-bound algorithm to traverse the tree structure in generating the desired query result.

It is still a further object of the invention to optimize the performance of a range max/min query method by using a jump-node algorithm together with one or more reference arrays of the same size as an array representing the data, so that the maximum or minimum value in an attribute range can be quickly computed.

To achieve these and other objects, the present invention provides a method for performing a range max/min query on a data cube comprising the steps of: (i) partitioning the data cube into multiple levels of d-dimensional blocks; (ii) representing the blocks as a tree structure where the nodes at level n of the tree correspond respectively to the n-level blocks; (iii) for each block, determining the cell index of the max/min value; (iv) storing the determined cell indexes into the nodes corresponding respectively with the blocks; and (v) generating a range max/min result from the values of the cells in the query region Q and those referenced by the indexes stored in the tree nodes.

In accordance with the invention, the query method uses a branch-and-bound method such as those described by L. G. Mitten in "Branch-and-Bound Methods: General Formulation and Properties," Operations Research Journal, No. 18, 1970, pp. 24–34, to accelerate the generation of the range max/min result. The step of generating the result thus includes the steps of: (a) identifying a node x of the tree where the node x corresponds to the smallest block that includes the query region Q; and (b) repeatedly reducing the size of the query region Q to determine a cell that has the range max/min result, based on the cell indexes of selected nodes of a sub-tree whose root node is the node x.

The step of reducing the size of the query region Q preferably includes the steps of: (a) initializing a variable u with the index of any cell in the query region Q; (b) determining whether the value indexed by $x_i$, where $x_i$ is the index stored at node x, is larger than the value indexed by the variable u and whether the cell indexed by $x_i$ is within the query region Q; (c) if the value indexed by $x_i$ is larger than the value indexed by u and the cell indexed by $x_i$ is within the query region Q, then updating the variable u with the index $x_i$; (d) if the value indexed by $x_i$ is larger than the value indexed by u and the cell indexed by $x_i$ is outside the query region Q, then for each child node z of node x where the block corresponding to node z intersects with Q, performing steps (b)–(e) recursively with node x substituted by node z; and (e) returning the value of u as the range max/min result.

In the case where the value indexed by $x_i$ is larger than the value indexed by the variable u and the cell indexed by $x_i$ is outside the query region Q, the sequence of child nodes considered in step (d) is important to the performance of the method. Therefore, in a preferred embodiment of the invention, steps (b)–(e) are first recursively performed for each child node m of node x where the block corresponding to node m is included in Q. They are next executed for each child node n of node x, where the block corresponding to node n intersects Q, but not completely included in Q, and the cell referenced by n is within Q. Finally, for each child node p of node x where the block corresponding to node p intersects Q, but not completely included in Q, and the cell referenced by node p is outside the region Q, the steps (b)–(e) are recursively executed with node x substituted by node p.

To speed up the process of traversing the tree nodes in determining the range max/min value, one or more reference arrays may be created along one or more selected dimensions of the block structure. Such reference arrays are formed for each selected level of the block structure, and may be one-dimensional or multi-dimensional, depending of the number of selected dimensions. Furthermore, based on the characteristics of the data distribution in the data cube, the reference arrays may be jump-right arrays, jump-left arrays, or both, as described in more detail below for the preferred embodiments of the invention.

Alternatively, the reference arrays may be used without the tree structure to perform a range max/min query in a database in which the data is represented as a d-dimensional array A of many cells. Each cell has a combined value of the database's functional attributes and identified by an index. The method precomputes at least one reference d-dimensional array R of the same size as the array A, where each member R[i] of R references an index j of A such that j is closest to i with respect to a predetermined distance function between i and j, and a predetermined direction. If no such j exists, then R[i] references an out-of-bound index of A. The range max/min result is then generated from the values of the cells selected from those cells in the query region Q, using the precomputed reference arrays Rs. Preferably, each reference array R is traversed starting from the member of R corresponding to one of the cells in the region Q until all the cells in Q have been covered by R. The criteria for selecting which cell to be examined next is based on the predetermined distance function and direction. The data value indexed by the last examined member of the reference arrays R is returned as the range max/min result.

In the case where the reference arrays are one-dimensional, the arrays are traversed from their lower bounds of the range max/min queries until immediately before the upper bounds of the query ranges or out-of-bound indexes are found.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

The invention is primarily described as a method for performing a range-maximum or range-minimum (range max/min) query in a database. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
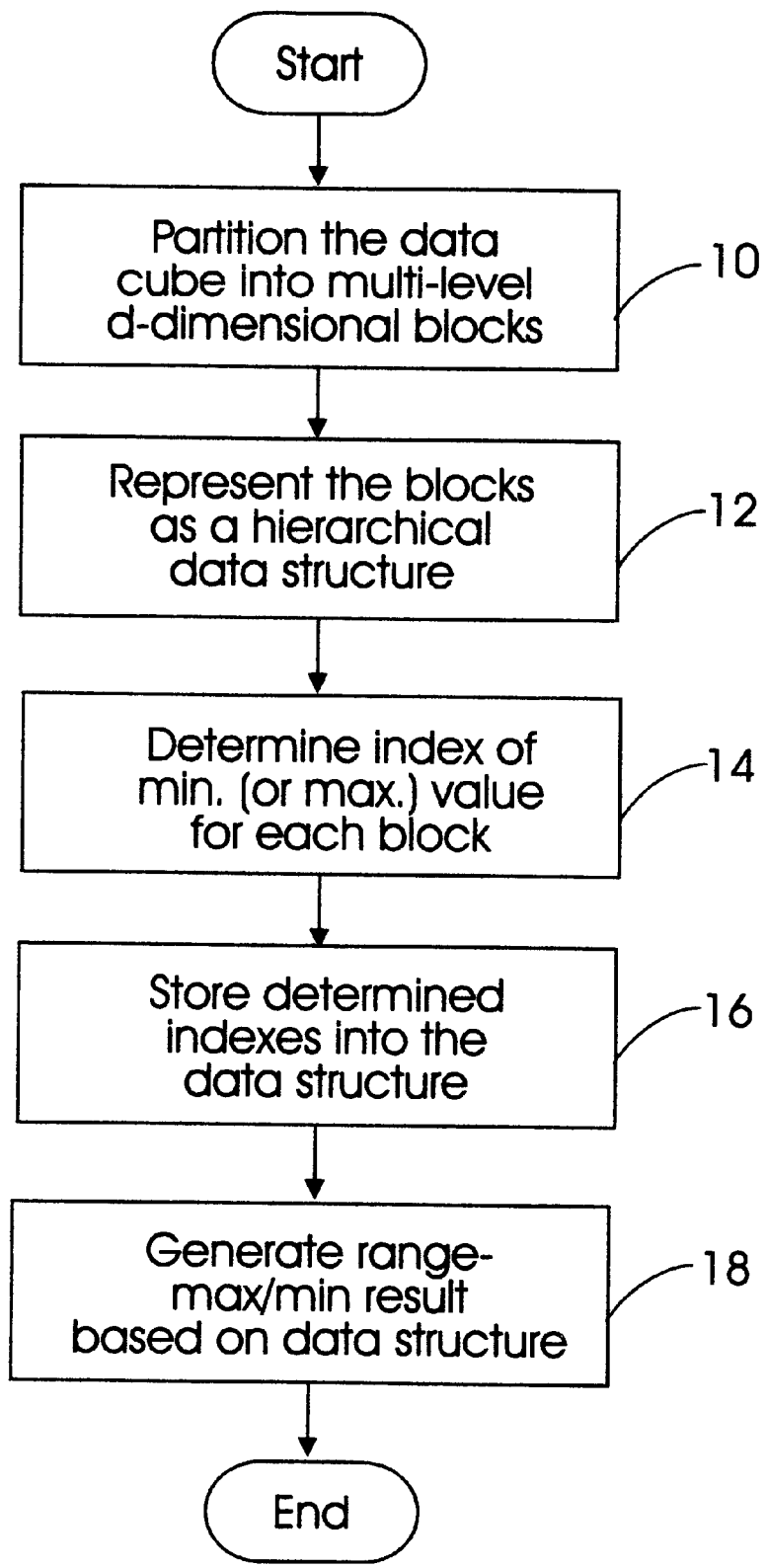
FIG. 1 is a high-level flow chart showing the general operation of the method for performing range max/min queries in a database, in accordance with the present invention.

FIG. 1 is a high-level flow chart illustrating the basic steps of the method for performing a range max-min query in a database, in accordance with the invention. The database typically has numerous data records where each record includes the value of one or more data attributes. One of these attributes is chosen to be the measure attribute while the remaining attributes are the functional attributes. In OLAP applications, the measure attribute of all records with the same combination of functional attributes are combined (e.g. summed up) into an aggregate value. The resulting database thus can be modeled as a d-dimensional array, or data cube, indexed by the values of the d functional attributes, where each dimension of the cube corresponds to a functional attribute. The data cube has many cells, where each cell contains the value of the measure attribute for the corresponding combination of functional attributes. A range max/min query thus corresponds to a d-dimensional sub-region of the data cube, defined by the specified range in each of the d dimensions.

Generally, the method employs a hierarchical data structure such as a tree to store precomputed indexing information on the cells of the d-dimensional data cube. The data cube represents the data in which each of its cells has a combined value of the data attributes and identified by a d-dimensional index. This index may have multiple index values, each corresponding to a data cube dimension. The maximum or minimum value of the range query then can be quickly determined from the hierarchical data structure using an efficient enumerative algorithm such as branch-and-bound methods.

Starting at step 10 of FIG. 1, the data cube is partitioned into a multi-level structure of d-dimensional blocks. Intuitively, a block at level n includes multiple smaller blocks at the next lower level n+1, and so on. The number of the next lower-level blocks of each block depends on a predetermined fanout factor. At step 12, the blocks are represented as a multiple-level data structure, such as a hierarchical tree structure. The tree includes a root node which branches into a number of internal nodes. Each internal node in turn branches into another set of internal nodes at the next lower level in the hierarchy. Eventually, the tree terminates with its leave nodes. The nodes at a level n of the tree correspond respectively to the blocks at level n of the data cube. A simple data cube, its blocks, and the tree representing the blocks are illustrated in FIGS. 2–4, which will be described below.

In step 14, for each d-dimensional block, the index of the cell with the maximum value (or minimum value, for a range-minimum query) is determined. The index determined for each block is stored into the node corresponding to this block, in step 16. The range max/min result is then generated in step 18, from the values of the cells selected from those in the query region Q and the cells referenced by the indexes stored at the nodes corresponding to the cells in the region Q.

Figure 2:
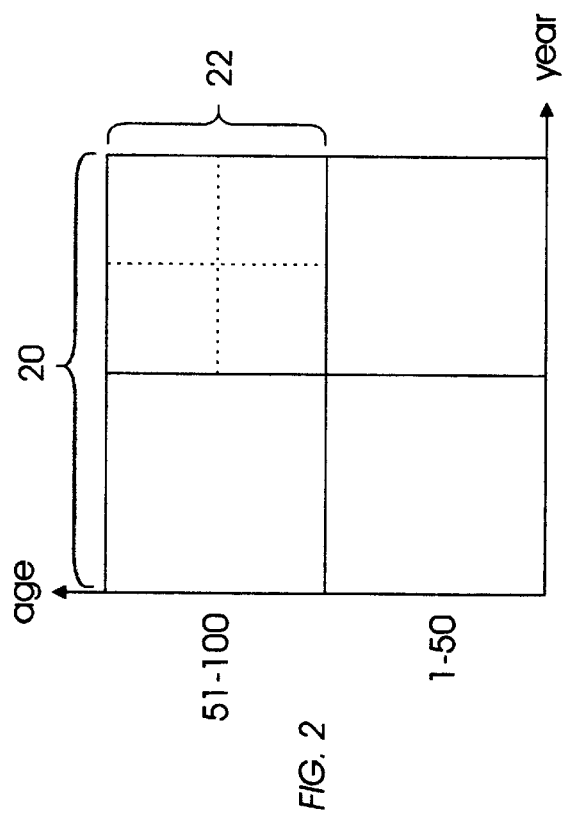
FIG. 2 illustrates a simple two-dimensional data cube partitioned into a multi-level structure of two-dimensional blocks.

FIG. 2 is an illustration of a simple two-dimensional data cube 20 representing an insurance company's database. The dimensions of the data cube 20 correspond to the two functional attributes of each insured customer: age and year In accordance with step 10 of FIG. 1, the data cube 20 is decomposed in this case into four level-1 blocks 22, where each block 22 is further decomposed into four level-2 blocks 24, and so on. The blocks 22, 24, and those at even lower levels of the block structure are all two-dimensional blocks. FIG. 3 illustrates a block 22 and its constituent blocks 24.

Figure 4:
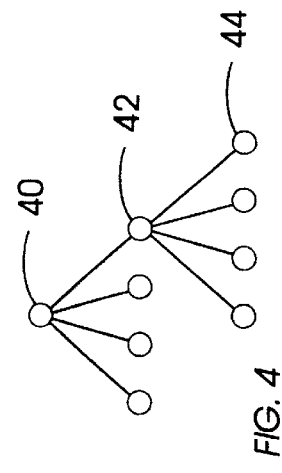
FIG. 4 illustrates a tree structure representing the blocks of FIGS. 2–3, according to step 12 of FIG. 1.
Figure 3:
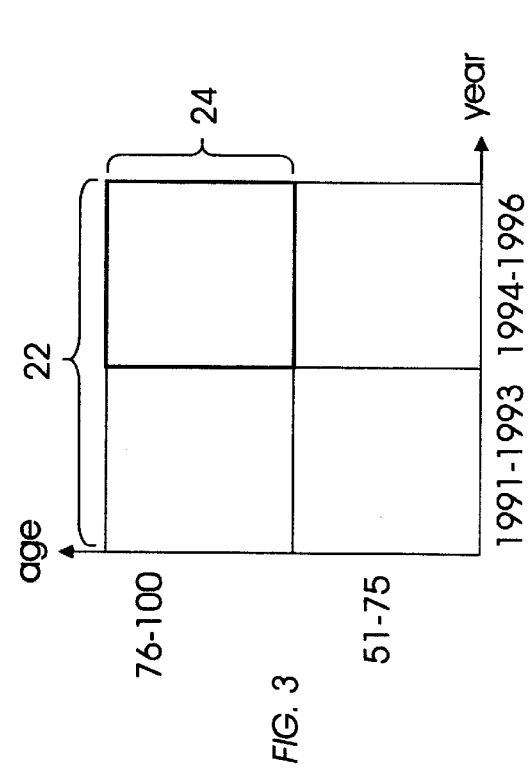
FIG. 3 illustrates the lower-level blocks that make up a block 22 of FIG. 2.

A tree structure representing the blocks in FIGS. 2 and 3 is shown in FIG. 4. The tree starts from a root node 40, which branches into four level-1 internal nodes 42. Each of nodes 42 further branches into four level-2 nodes 44, which are also the leaf nodes in this example. The tree structure thus has a fanout of four. According to step 12 of FIG. 1, the nodes 40, 42, and 44 correspond respectively to the data cube 20, blocks 22, and blocks 24 of FIGS. 2–3.

Figure 5:
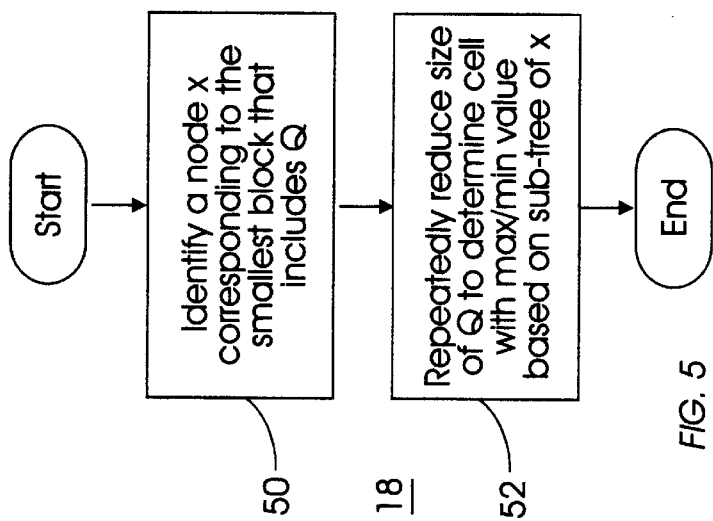
FIG. 5 is a flow chart showing further details of step 18 of FIG. 1, for generating a range max/min result.

FIG. 5 shows further details of step 18 of FIG. 1, for generating a range max/min result from the values of cells selected from those in the query region Q and those referenced by the nodes corresponding to the cells in Q. At step 50, a tree node x is identified such that x corresponds to the smallest block containing the query region Q. In other words, the node x is one such that it is furthest away from the tree root and that its corresponding block contains the query region Q. At step 52, the method repeatedly reduces the size of the query region Q to determine a cell having the maximum (or minimum, for a range-minimum query) value among the cells referenced by the indexes in selected nodes of a sub-tree whose root is the node x.

Figure 6:
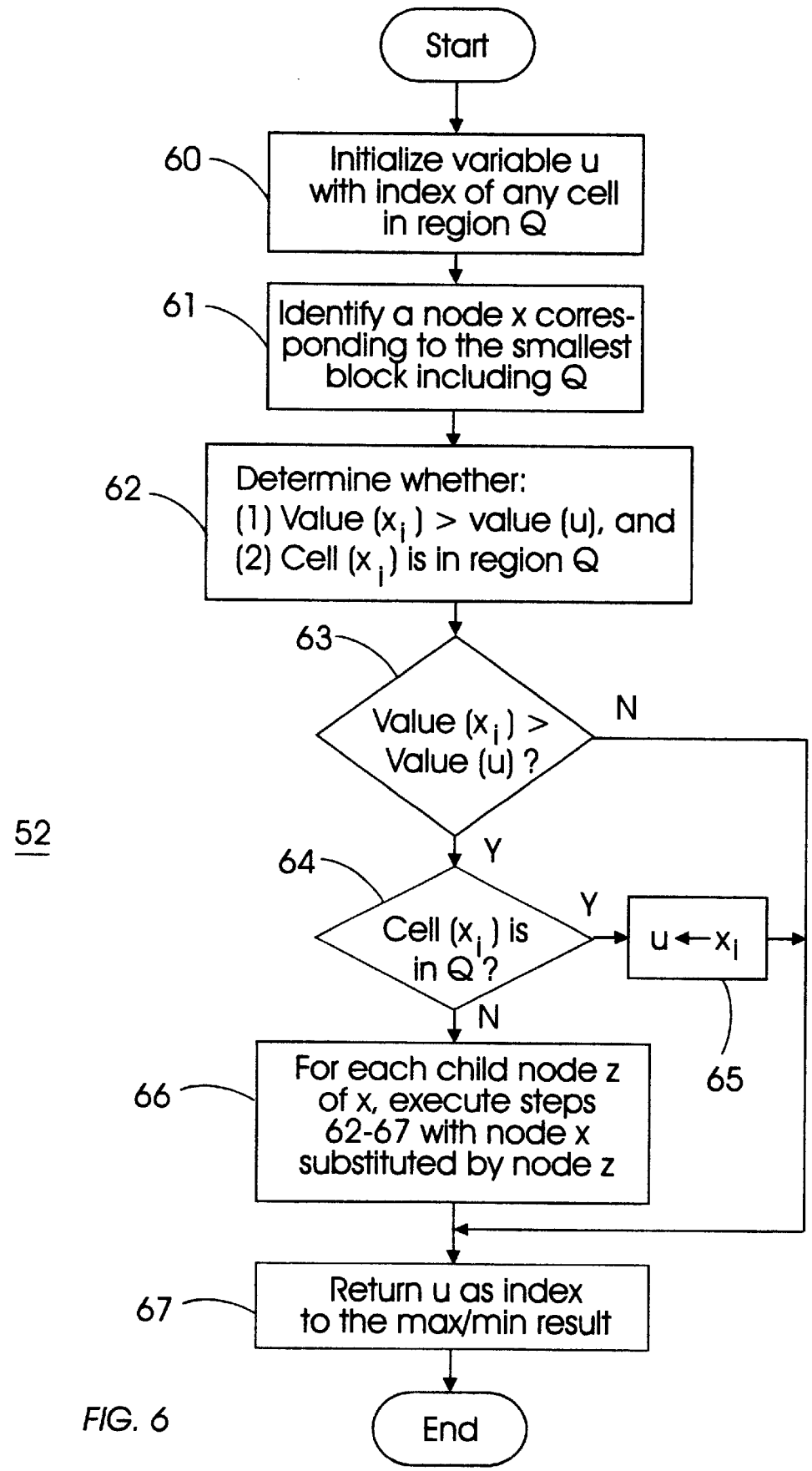
FIG. 6 is a flow chart showing a preferred embodiment of step 52 of FIG. 5, for repeatedly reducing the size of region Q to determine the cell having the maximum of minimum value, based on the sub-trees of the tree structure.

FIG. 6 is a flow chart showing a preferred embodiment of step 52, for repeatedly reducing the size of the region Q to determine the cell with the maximum value, in the case of a range-maximum query. The embodiment shown in FIG. 6 and its following figures equally apply to a range-minimum query by replacing the "larger than" conditions with "smaller than" conditions when comparing two values. Starting at step 60, a variable u indicating a current max/min index is initialized to the index value of an arbitrary cell in Q. At step 61, two conditions are checked: (1) whether the value of the cell indexed by $x_i$, where $x_i$ is the index stored at node x, is larger (or smaller, for range-minimum queries) than the value of the cell indexed by the variable U, and (2) whether the cell indexed by $x_i$ is within the region Q. If the value of the cell indexed by $x_i$ is no larger than the value of the cell indexed by u, regardless of whether the cell indexed by $x_i$ is within Q, then the value of u is returned as the index to the max/min result, at step 67. If the value of the cell indexed by $x_i$ is larger than the value of the cell indexed by u, and the cell indexed by $x_i$ is within Q, then U is made equal to the index $x_i$, in step 65. If the value of the cell indexed by $x_i$ is larger than the value of the cell indexed by u, and the cell indexed by $x_i$ is outside the region Q, then for each child node z of node x such that the block corresponding to node z intersects with Q, steps 62–66 are recursively performed with node x substituted by node z, as shown by step 66. The last value of variable u is returned in step 67 as the index to the range max/min result.

Figure 7:
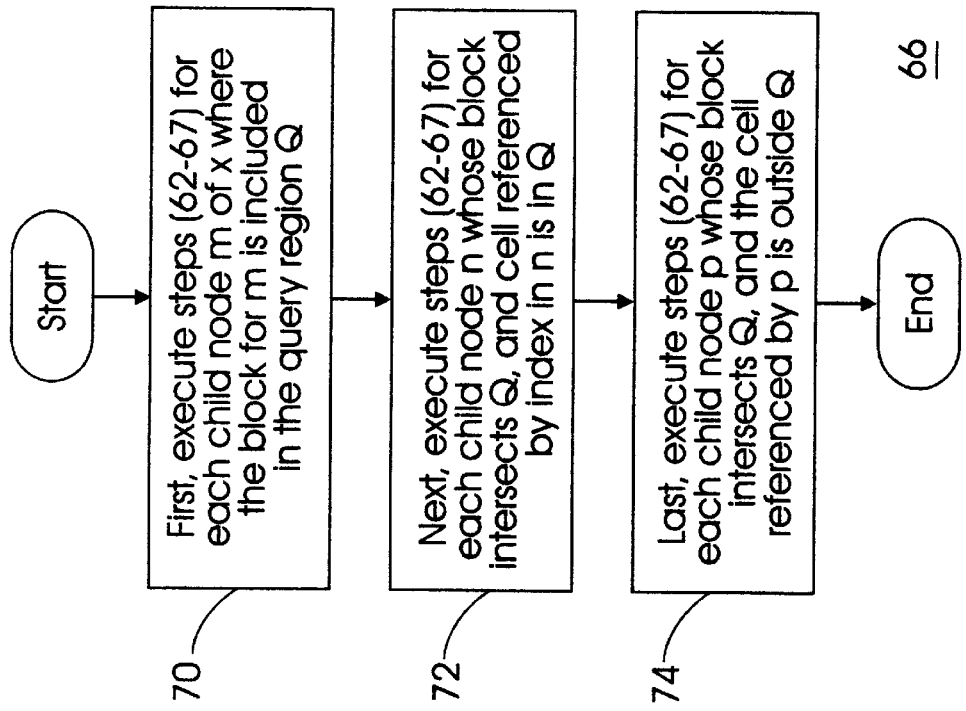
FIG. 7 is a flow chart showing a preferred embodiment of step 66 of FIG. 6, for recursively executing steps 62–67 for each child node z of node x.

The flow chart of FIG. 7 shows more details of step 66 (for recursively executing steps 62–66 for each child node z of node x) in which the degree of intersection between the region Q and the block corresponding to a child node is taken into consideration. In the preferred embodiment of the invention, the regions of the data cube corresponding to the child nodes of x that are completely within the query region a are generally examined before those intersecting Q, but not completely within Q. That is, the child nodes for internal regions of Q are considered before those for boundary regions. Such an order of examination improves the performance of the method because by first considering the nodes for the internal regions, the nodes for some boundary regions may not need be considered at all. This is because the maximum (or minimum) value for a boundary region might have been covered by the value of the current max/min index found so far. Accordingly, at step 70, the steps 62–66 of FIG. 6 are first executed for each child node m of node x, where the block corresponding to node m is completely within Q, with node x substituted by node m. Next, at step 72, the steps 62–66 of FIG. 6 are performed for each child node n of x, with node x substituted by n, if the block corresponding to node n intersects Q, but not completely within Q, and the cell indexed by n is within the query region Q. Finally, at step 74, steps 62–66 are executed for each child node p of node x, with node x substituted by p, if the block corresponding to the child node p of node x intersects Q, but not completely within Q, and the cell indexed by p is outside the query region Q.

To further improve the response time of the above-described query method, one or more reference arrays along one or more selected dimensions of the blocks may be used to speed up the traversing of the nodes in determining the range max/min value. Such reference arrays are formed for each selected level of the block structure, typically of the same size as the number of blocks at the selected level, and may be one-dimensional or multi-dimensional. In one-dimensional cases, the reference arrays may be jump-right arrays, jump-left arrays, or both, depending on the characteristics of the data distribution in the data cube. For a jump-right array, the next element to be processed is to the right of the currently processed element, while in a jump-left array, the next element is to the left of the current element. An example of a jump-right reference array is described below with respect to Table 1.

Generally, if the data values decrease along a dimension as the index increases, then a jump-right reference array is preferred for better performance. On the other hand, a jump-left array would perform better where the data values generally increase as the cell index increases. Furthermore, different types of reference arrays may be used in an embodiment of the method to best match the data distribution along each dimension of the data cube.

Figure 8:
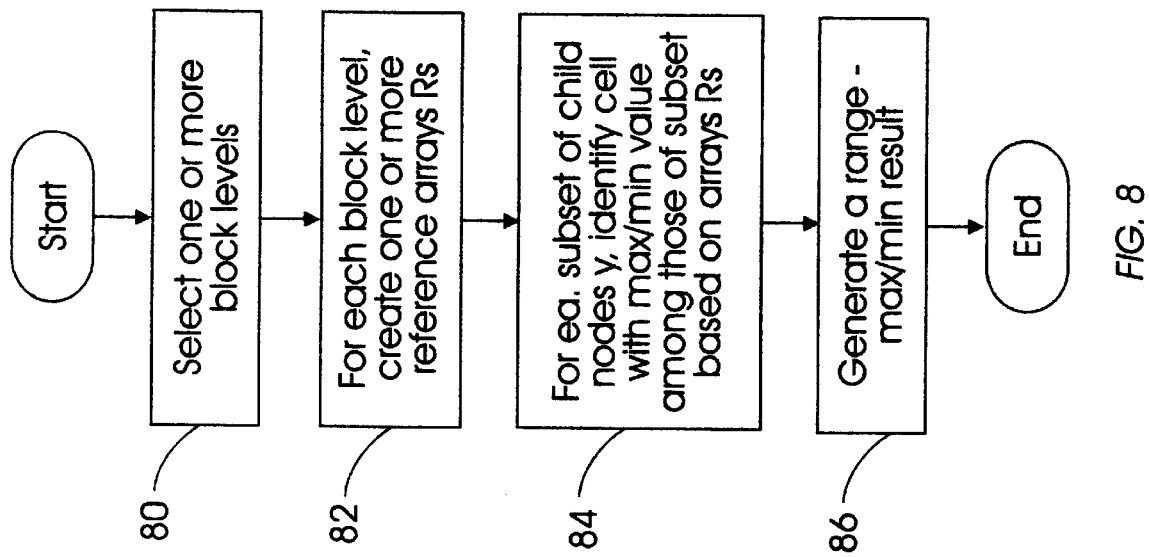
FIG. 8 is a flow chart showing further steps of the method illustrated in FIG. 1, using one or more reference arrays to improve the performance of the method.

Referring to FIG. 8, a flow chart is provided showing addtitional steps of the method represented by FIG. 1, where the reference arrays are used in conjunction with the tree structure to improve the performance of the query method.

In addition to the steps described above for FIG. 1, in step 80, one or more block levels are selected for creating the reference arrays. At step 82, for each block level, one or more reference arrays Rs are created based on one or more block dimensions. The reference arrays Rs are of the same size as the number of blocks at the selected level. Each member R[i] of R, where i is an index of R, references an index j of the array A such that j is closest to i with respect to a predetermined distance function and direction, and references an out-of-bound index if no such j exists. As an example, in a two-dimensional plane where $(x_i, y_i)$ denotes the coordinates of a point i, a distance function between point $(x_1, y_1)$ and point $(x_2, y_2)$ may be defined as $\sqrt{|x_1-x_2|^2+|y_1-y_2|^2}$, while the direction of interest may be the first quadrant of the plane, i.e., for $x \geq 0$ and $y \geq 0$.

In the preferred embodiment of the invention, step 84 is next performed for each subset of child nodes y of a node x where the blocks corresponding to the nodes y are within the query region Q. In step 84, the index of the cell having the maximum (or minimum) value among the cells referenced by the nodes of the subset is identified, using the reference arrays Rs. The range max/min result is then computed in step 86 as described above for step 18 of FIG. 1 and its preferred embodiment illustrated in FIGS. 5–7.

As an example, consider a query input range (l:h), where l and h are the range lower and upper bounds, respectively. The size of the range is thus given by r=h−l+1. In the case where a jump-right reference array R is used, for every element A[i] of the array A, each element R[i] of the array R is precomputed as follows:

$$R[i] = \begin{cases} j, \text{ if } j < n \text{ and } (\forall k)(i < k < j \Rightarrow A[j] > [i] \geq A[k]) \\ n, \text{ if } (\forall k)(i < k < n \Rightarrow A[i] \geq A[k]) \end{cases}$$

where n is the number of members in each of arrays A and R.

That is, R[i] references an index j which is the first index larger than i and satisfies A[j]>A[i]. If j cannot be found, then we let R[i] references and out-of-bound index, such as n if $0 \leq i \leq n-1$. Table 1 below shows an example of an array A, and reference arrays R and L, with the number of elements in each array being n=10.

TABLE 1

| Index i | 0 | 1 | 2 | 3 | 4 | 5 | 6 | 7 | 8 | 9 |
|---|---|---|---|---|---|---|---|---|---|---|
| A | 4 | 2 | 8 | 6 | 9 | 4 | 7 | 3 | 6 | 5 |
| R | 2 | 2 | 4 | 4 | 10 | 6 | 10 | 8 | 10 | 10 |
| L | −1 | 0 | −1 | 2 | −1 | 4 | 4 | 6 | 6 | 8 |

The process for finding the index of the maximum value in the range (l: h) is illustrated in the following pseudo-code.

```
max_index = l;
while (R[max_index] <= h)
    max_index = R[max_index];
return (max_index);
```

Figure 9:
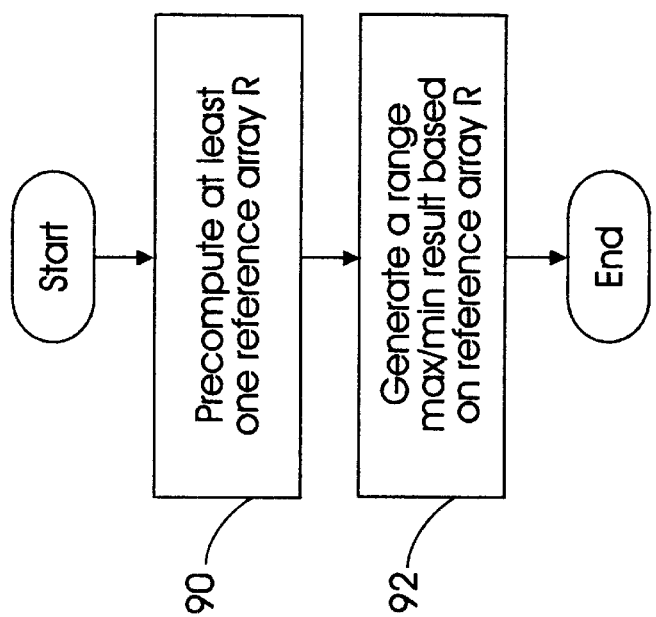
FIG. 9 is a high-level flow chart showing the operation of the method for performing range max/min queries in a database, using one or more reference arrays.

Alternatively, the reference arrays by themselves, without the tree structure, may be used for performing range max/min queries in a database in which the data is represented by a d-dimensional array A of many cells. Such a method, however, is not as efficient in terms of storage requirement as when both the tree and reference arrays are used. FIG. 9 is a flow chart showing a method for performing range max/min queries with the reference arrays alone. Each cell of the input array A has a value of the measure attribute of interest and identified by a d-dimensional index. The range max/min query thus corresponds to a region Q of the array A. Starting with step 90, at least one reference array H, which is d-dimensional and of the same size as the array A, is created similar to step 82 above. Each member R[i] of R, where i is an index of R, references an index j of the array A such that j is closest to i with respect to a predetermined distance function and direction, and references an out-of-bound index if no such j exists. At step 92, a range max/min result is generated from the values of the cells selected from the cells in the query region Q, based on the precomputed reference arrays Rs.

Figure 10:
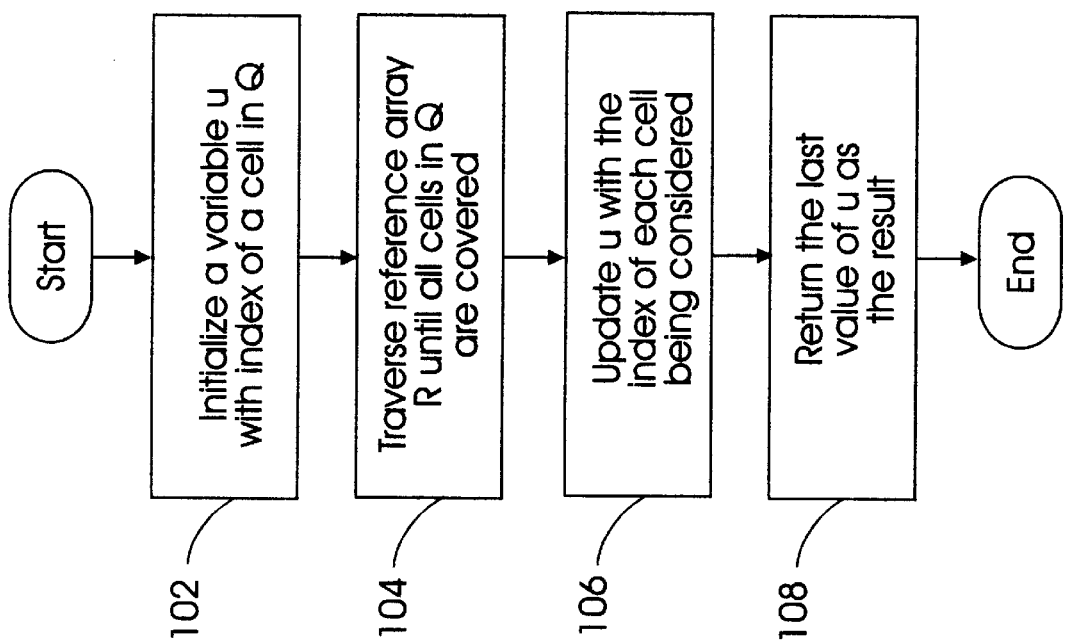
FIG. 10 is a flow chart showing further details of step 92 in FIG. 9, for generating a range max/min result from the values of the cells selected from the query region Q, based on the reference arrays.

FIG. 10 illustrates more details of step 92, for generating a range max/min result based on the reference arrays Rs. At step 102 a variable u is initialized with the index of any cells in the query region Q. For each reference array R being considered, the method traverses H starting from a member of R corresponding to the cell in the query region Q until all cells in Q have been covered, in step 104. This coverage is based on the predetermined distance function and direction described above. The variable u is updated with the cell index of the cell being considered, while the array R is being traversed, as shown by step 106. Once all the cells of each array R and all the reference arrays Rs have been considered according to the predetermined distance function and direction, the last value of u is returned as the answer, in step 108. This value is the index to the cell containing the queried range max/min value. Note that the reference arrays R may be one-dimensional or multi-dimensional, depending on the number of dimensions of the original array A representing the database. In the case R is a one-dimensional array, it is traversed starting from the lower bound of the query range until immediately before the upper bound of the query range or the out-of-bound index is encountered.

Another improvement on the query method shown in FIG. 1 may also be made by storing at each node the t indexes to the top t values, in descending order, of all cells in the block corresponding to that node. In other words, we choose the t largest values from all cells in the block and store their corresponding t indexes in the tree node for that block. Having stored more than one index at each tree node increases the chance of finding an index that references a cell inside the query region Q, where the index is stored at a tree node whose corresponding block overlaps with, but not completely contained in, the region Q. If an index is found inside the query region Q, then the recursion at step 66 of FIG. 6 is not required, because either step 65 or a negative branch from step 63 will be performed.

Figure 11:
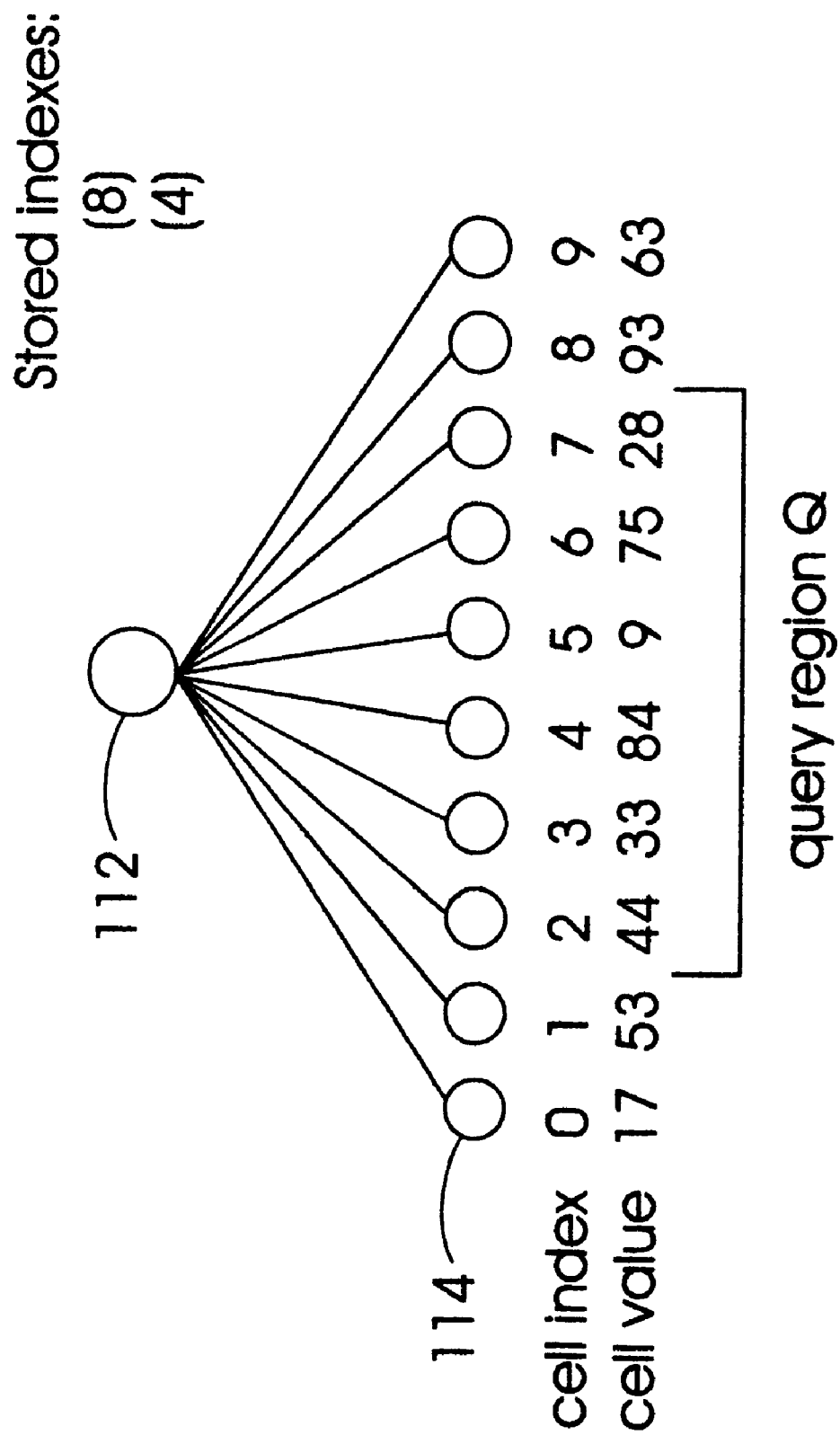
FIG. 11 illustrates a portion of a tree structure where the indexes to the top two values selected from all cells in each block are stored at the node corresponding that block, for improving the query response time.

For example, consider a part of a tree structure in FIG. 11. There are an internal node 112 and ten leaf nodes 114. Each leaf node 114 has a cell index ranging from (0) to (9) as listed immediately below the leaf nodes. The value of the cell pointed to by each cell index is also listed under the respective cell index for easy reference. Assume that the query region Q includes the cells indexed by (2) through (7). In other words, the query region Q has a range of i's, for $2 \leq i \leq 7$. Assume further that the value t is chosen as two. Thus, there are two stored indexes at the internal node 112. In this case, the two indexes stored at the internal node 112 are (8) and (4), in that order. That is, cell A[8] is the largest value among all cells from A[0] through A[9], and cell A[4] is the second largest one among all cells from A[0] through A[9]. In this example, in finding the maximum value in the query region Q, we first check if the first index, which is (8) in this case, is in the region Q. Since the first index is not in the query region Q, we then check if the second index, which is (4) in this case, is in the query region Q. Since the second index is in the query region Q, we have found A[4] as the maximum value in the query region Q. Note that if only one index were stored at each internal node, then we would have to go through the cells A[2], A[3], . . . , A[7], one at a time in order to find the maximum value A[4]. This example shows that storing more than one index at each internal node reduces the chance of having to search the nodes at a lower level of the tree, and therefore improves the query response time.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for performing a range max/min query in a database represented as a d-dimensional data cube having a plurality of cells, each cell having a value and identified by an index, the range max/min query corresponding to a region Q of the data cube, the method comprising the steps of:

partitioning the data cube into a plurality of multi-level d-dimensional blocks;

representing the blocks as a multi-level tree structure having a plurality of nodes, the n-level nodes of the tree corresponding respectively to the n-level blocks;

for each block, determining the index of a cell with a max/min value among the cells in the block;

storing the determined cell indexes for the blocks into the corresponding nodes; and generating a range max/min result from the values of the cells selected from the cells in the query region Q and the cells referenced by the indexes at the nodes corresponding to the cells in the query region Q.

2. The method as recited in claim 1, wherein the step of generating a range max/min result includes the steps of:

(a) identifying a node x of the tree where the node x corresponds to a smallest block that includes the query region Q; and (b) repeatedly reducing the size of the region Q to determine a cell having the range max/min result, based on the cell indexes from selected nodes of a sub-tree of the tree, the sub-tree having a root node that is the same as the identified node x.

3. The method as recited in claim 2, wherein:

the tree includes a root node branching into multiple levels of internal nodes and terminates with a plurality of leaf nodes, the leaf nodes corresponding to the cells of the data cube, the root and internal nodes each having a plurality of child nodes; and the step of reducing the size of Q includes the steps of:

(a) initializing a variable u with the index of any cell in the query region Q;

(b) determining whether the value of a cell indexed by $x_i$, where $x_i$ is the index stored at node x, is larger than the value of a cell indexed by the variable u and whether the cell indexed by $x_i$ is within the query region Q;

(c) if the value of the cell indexed by $x_i$ is larger than the value of the cell indexed by u and the cell indexed by $x_i$ is within the query region Q, then updating the variable u with the index $x_i$;

(d) if the value of the cell indexed by $x_i$ is larger than the value of the cell indexed by u and the cell indexed by $x_i$ is outside the query region Q, then for each child node z of node x where the block corresponding to node z intersects with Q, executing steps (b)–(e) with node x being substituted by node z; and (e) returning the value of u as the range-max/min result.

4. The method as recited in claim 3, wherein the step of executing steps (b)–(e) includes the steps of:

first, executing the steps (b)–(e) for each child node m of node x, with node x being substituted by node m, where the block corresponding to node m is included in the query region Q;

next, executing the steps (b)–(e) for each child node n of node x, with node x being substituted by node n, where the block corresponding to node n intersects Q, but not completely included in Q, and the cell referenced by the index at node n is within the query region Q; and lastly, executing the steps (b)–(e) for each child node p of node x, with node x being substituted by node p, where the block corresponding to node p intersects Q, but not completely included in Q, and the cell referenced by the index at node p is outside the query region Q.

5. The method as recited in claim 1 further comprising the steps of:

selecting at least one level of the blocks;

for each selected block level, creating at least one reference array R based on at least one of the block dimensions; and wherein the step of generating a range min/max result is based on the reference arrays Rs.

6. The method as recited in claim 5, wherein:

the tree includes a root node branching into multiple levels of internal nodes and terminates with a plurality of leaf nodes, the leaf nodes corresponding to the cells in the data cube, the root and internal nodes each having a plurality of child nodes;

the method further includes the step, for each subset of child nodes y of a node x where the blocks corresponding to the nodes y are within the query region Q, of identifying the index to a cell with a maximum value among the cells referenced by the subset of nodes, based on the reference arrays Rs; and the step of generating a range max/min result includes the steps of:
(a) identifying a node x of the tree where the node x corresponds to a smallest block that includes the query region Q; and
(b) repeatedly reducing the size of the region Q to determine a cell having the range max/min result, based on the cell indexes referenced by the nodes of a sub-tree of the tree, the sub-tree having a root node that is the same as the identified node x.

7. The method as recited in claim 6, wherein:
the step of reducing the size of Q includes the steps of:
(a) initializing a variable u with the index of any cell in the query region Q;
(b) determining whether the value of a cell indexed by $x_i$, where $x_i$ is the index stored at node x, is larger than the value of a cell indexed by the variable u and whether the cell indexed by $x_i$ is within the query region Q;
(c) if the value of the cell indexed by $x_i$ is larger than the value of the cell indexed by u and the cell indexed by $x_i$ is within the query region Q, then updating the variable U with the index $x_i$;
(d) if the value of the cell indexed by $x_i$ is larger than the value of the cell indexed by u and the cell indexed by $x_i$ is outside the query region Q, then for each child node z of node x where the block corresponding to node z intersects with Q, executing steps (b)–(e) with node x being substituted by node z; and
(e) returning the value of u as the range-max/min result.

8. The method as recited in claim 1, wherein:
the step of determining the index includes the step of identifying, for each block, the indexes of the cells whose values are equal to or greater than those of remaining cells in the block, the identified indexes being in an order; and
the generation of the range max/min result is based on the values of the cells referenced by the ordered indexes.

9. The method as recited in claim 8, wherein the step of generating a range max/min result includes the steps of:
(a) identifying a node x of the tree where the node x corresponds to a smallest block that includes the query region Q; and
(b) repeatedly reducing the size of the region Q to determine a cell having the range max/min result, based on the cell indexes referenced by the nodes of a sub-tree of the tree, the sub-tree having a root node that is the same as the identified node x.

10. A method for performing a range max/min query in a database represented by a d-dimensional array A having a plurality of cells, each cell having a value and identified by an index, the range max/min query corresponding to a region Q of the array A, the method comprising the steps of:
precomputing at least one d-dimensional reference array R of the same size as the array A, each member R[i] of R referencing an index i of the array A such that j is closest to i with respect to a predetermined distance function and direction, and referencing an out-of-bound index of A if no such j exists;

generating a range max/min result from the values of the cells selected from those in the query region Q, based on the precomputed reference arrays Rs.

11. The method as recited in claim 10, wherein the step of generating a max/min result includes the steps of:
initializing a variable u with the index of any cell in the query region Q;
traversing a reference array R starting from a member of R corresponding to a cell in the query region Q until all cells in Q have been covered, the coverage being based on the predetermined distance function and direction;
updating the variable u with the index of each cell of R being considered during the step of traversing; and
returning the last value of u as the range max/min result.

12. The method as recited in claim 11, wherein:
the reference arrays R are one-dimensional; and
the step of traversing includes the step of traversing the reference array R from a lower bound of the query range until immediately before an upper bound of the query range or the out-of-bound index is found.

13. A computer program product for use with a computer system for performing a range max/min query in a database represented as a d-dimensional data cube having a plurality of cells, each cell having a value and identified by an index, the range max/min query corresponding to a region Q of the data cube, the computer program product comprising:
a computer-readable medium;
means, provided on the computer-readable medium, for directing the system to partition the data cube into a plurality of multi-level d-dimensional blocks;
means, provided on the computer-readable medium, for directing the system to represent the blocks as a multi-level tree structure having a plurality of nodes, the n-level nodes of the tree corresponding respectively to the n-level blocks;
means, provided on the computer-readable medium, for directing the system to determine, for each block, the index of a cell with a max/min value among the cells in the block;
means, provided on the computer-readable medium, for directing the system to store the determined cell indexes for the blocks into the corresponding nodes; and
means, provided on the computer-readable medium, for directing the system to generate a range max/min result from the values of the cells selected from the cells in the query region Q and the cells referenced by the indexes at the nodes corresponding to the cells in the query region Q.

14. The computer program product as recited in claim 13, wherein the means for directing to generate a range max/min result includes:
(a) means, provided on the computer-readable medium, for directing the system to identify a node x of the tree where the node x corresponds to a smallest block that includes the query region Q; and
(b) means, provided on the computer-readable medium, for directing the system to repeatedly reduce the size of the region Q to determine a cell having the range max/min result, based on the cell indexes from selected nodes of a sub-tree of the tree, the sub-tree having a root node that is the same as the identified node x.

15. The computer program product as recited in claim 14, wherein:
the tree includes a root node branching into multiple levels of internal nodes and terminates with a plurality of leaf nodes, the leaf nodes corresponding to the cells of the data cube, the root and internal nodes each having a plurality of child nodes; and the means for directing to reduce the size of Q includes means, provided on the computer-readable medium, for directing the system to perform the steps of:

(a) initializing a variable u with the index of any cell in the query region Q;

(b) determining whether the value of a cell indexed by $x_i$, where $x_i$ is the index stored at node x, is larger than the value of a cell indexed by the variable u and whether the cell indexed by $x_i$ is within the query region Q;

(c) if the value of the cell indexed by $x_i$ is larger than the value of the cell indexed by u and the cell indexed by $x_i$ is within the query region Q, then updating the variable u with the index $x_i$;

(d) if the value of the cell indexed by $x_i$ is larger than the value of the cell indexed by u and the cell indexed by $x_i$ is outside the query region Q, then for each child node z of node x where the block corresponding to node z intersects with Q, executing steps (b)–(e) with node x being substituted by node z; and (e) returning the value of u as the range-max/min result.

16. The computer program product as recited in claim 15, wherein the step of executing steps (b)–(e) includes the steps of:

first, executing the steps (b)–(e) for each child node m of node x, with node x being substituted by node m, where the block corresponding to node m is included in the query region Q;

next, executing the steps (b)–(e) for each child node n of node x, with node x being substituted by node n, where the block corresponding to node n intersects Q, but not completely included in Q, and the cell referenced by the index at node n is within the query region Q; and lastly, executing the steps (b)–(e) for each child node p of node x, with node x being substituted by node p, where the block corresponding to node p intersects Q, but not completely included in Q, and the cell referenced by the index at node p is outside the query region 0.

17. The computer program product as recited in claim 13 further comprising:

means, provided on the computer-readable medium, for directing the system to select at least one level of the blocks;

means, provided on the computer-readable medium, for directing the system to create, for each selected block level, at least one reference array R based on at least one of the block dimensions; and wherein the range min/max result is generated based on the reference arrays Rs.

18. The computer program product as recited in claim 17, wherein:

the tree includes a root node branching into multiple levels of internal nodes and terminates with a plurality of leaf nodes, the leaf nodes corresponding to the cells in the data cube, the root and internal nodes each having a plurality of child nodes;

the computer program product further comprises, for each subset of child nodes y of a node x where the blocks corresponding to the nodes y are within the query region Q, means provided on the computer-readable medium for directing the system to identify the index to a cell with a maximum value among the cells referenced by the subset of nodes, based on the reference arrays Rs; and the means for directing to generate a range max/min result includes:

(a) means, provided on the computer-readable medium, for directing the system to identify a node x of the tree where the node x corresponds to a smallest block that includes the query region Q; and (b) means, provided on the computer-readable medium, for directing the system to repeatedly reduce the size of the region Q to determine a cell having the range max/min result, based on the cell indexes referenced by the nodes of a sub-tree of the tree, the sub-tree having a root node that is the same as the identified node x.

19. The computer program product as recited in 18, wherein the means for directing to reduce the size of Q includes means, provided on the computer-readable medium, for directing the system to perform the steps of:

(a) initializing a variable u with the index of any cell in the query region Q;

(b) determining whether the value of a cell indexed by $x_i$, where $x_i$ is the index stored at node x, is larger than the value of a cell indexed by the variable u and whether the cell indexed by $x_i$ is within the query region Q;

(c) if the value of the cell indexed by $x_i$ is larger than the value of the cell indexed by u and the cell indexed by $x_i$ is within the query region Q, then updating the variable u with the index $x_i$;

(d) if the value of the cell indexed by $x_i$ is larger than the value of the cell indexed by u and the cell indexed by $x_i$ is outside the query region Q, then for each child node z of node x where the block corresponding to node z intersects with Q, executing steps (b)–(e) with node x being substituted by node z; and (e) returning the value of u as the range-max/min result.

20. The computer program product as recited in claim 13, wherein:

the means for directing to determine the index includes means, provided on the computer-readable medium, for directing the system to identify, for each block, the indexes of the cells whose values are equal to or greater than those of remaining cells in the block, the identified indexes being in an order; and the generation of the range max/min result is based on the values of the cells referenced by the ordered indexes.

21. The computer program product as recited in claim 20, wherein:

the means for directing to generate a range max/min result includes:

(a) means, provided on the computer-readable medium, for directing the system to identify a node x of the tree where the node x corresponds to a smallest block that includes the query region Q; and (b) means, provided on the computer-readable medium, for directing the system to repeatedly reduce the size of the region Q to determine a cell having the range max/min result, based on the cell indexes referenced by the nodes of a sub-tree of the tree, the sub-tree having a root node that is the same as the identified node x.

22. A computer program product for performing a range max/min query in a database represented by a d-dimensional array A having a plurality of cells, each cell having a value and identified by an index, the range max/min query corresponding to a region Q of the array A, the computer program product comprising:

means, provided on the computer-readable medium, for directing the system to precompute at least one d-dimensional reference array R of the same size as the array A, each member R[i] of R referencing an index j of the array A such that j is closest to i with respect to a predetermined distance function and direction, and referencing an out-of-bound index of A if no such j exists;

means, provided on the computer-readable medium, for directing the system to generate a range max/min result from the values of the cells selected from those in the query region Q, based on the precomputed reference arrays Rs.

23. The computer program product as recited in claim 22, wherein the means for directing to generate a max/min result includes:

means, provided on the computer-readable medium, for directing the system to initialize a variable u with the index of any cell in the query region Q;

means, provided on the computer-readable medium, for directing the system to traverse a reference array R starting from a member of R corresponding to a cell in the query region Q until all cells in Q have been covered, the coverage being based on the predetermined distance function and direction;

means, provided on the computer-readable medium, for directing the system to update the variable u with the index of each cell of R being considered during the step of traversing; and means, provided on the computer-readable medium, for directing the system to return the last value of u as the range max/min result.

24. The computer program product as recited in claim 23, wherein:

the reference arrays R are one-dimensional; and the means for directing to traverse includes means, provided on the computer-readable medium, for directing the system to traverse the reference array R from a lower bound of the query range until immediately before an upper bound of the query range or the out-of-bound index is found.

25. A database system for performing a range max/min query in a database represented as a d-dimensional data cube having a plurality of cells, each cell having a value and identified by an index, the range max/min query corresponding to a region Q of the data cube, the system comprising:

means for partitioning the data cube into a plurality of multi-level d-dimensional blocks;

means for representing the blocks as a multi-level tree structure having a plurality of nodes, the n-level nodes of the tree corresponding respectively to the n-level blocks;

for each block, means for determining the index of a cell with a max/min value among the cells in the block;

means for storing the determined cell indexes for the blocks into the corresponding nodes; and means for generating a range max/min result from the values of the cells selected from the cells in the query region Q and the cells referenced by the indexes at the nodes corresponding to the cells in the query region Q.

26. The system as recited in claim 25, wherein the means for generating a range max/min result includes:

(a) means for identifying a node x of the tree where the node x corresponds to a smallest block that includes the query region Q; and (b) means for repeatedly reducing the size of the region Q to determine a cell having the range max/min result, based on the cell indexes referenced by the nodes of a sub-tree of the tree, the sub-tree having a root node that is the same as the identified node x.

27. The system as recited in claim 26, wherein:

the tree includes a root node branching into multiple levels of internal nodes and terminates with a plurality of leaf nodes, the leaf nodes corresponding to the cells of the data cube, the root and internal nodes each having a plurality of child nodes; and the means for reducing the size of Q includes:

(a) means for initializing a variable u with the index of any cell in the query region Q;

(b) means for determining whether the value of a cell indexed by $x_i$, where $x_i$ is the index stored at node x, is larger than the value of a cell indexed by the variable U and whether the cell indexed by $x_i$ is within the query region Q;

(c) if the value of the cell indexed by $x_i$ is larger than the value of the cell indexed by u and the cell indexed by $x_i$ is within the query region Q, then means for updating the variable u with the index $x_i$;

(d) if the value of the cell indexed by $x_i$ is larger than the value of the cell indexed by u and the cell indexed by $x_i$ is outside the query region Q, then for each child node z of node x where the block corresponding to node z intersects with Q, means for recursively operating the means in (b)–(e) with node x being substituted by node z; and (e) means for returning the value of u as the range-max/min result.

28. The system as recited in claim 27, wherein:

the recursively operating means first operates for each child node m of node x, with node x being substituted by node m, where the block corresponding to node m is included in the query region Q;

the recursively operating means next operates for each child node n of node x, with node x being substituted by node n, where the block corresponding to node n intersects Q, but not completely included in Q, and the cell referenced by the index at node n is within the query region Q; and the recursively operating means finally operates for each child node p of node x, with node x being substituted by node p, where the block corresponding to node p intersects Q, but not completely included in Q, and the cell referenced by the index at node p is outside the query region Q.

29. The system as recited in claim 25 further comprising:

means for selecting at least one level of the blocks;

for each selected block level, means for creating at least one reference array R based on at least one of the block dimensions; and wherein the range min/max result is generated based on the reference arrays Rs.

30. The system as recited in claim 29, wherein:

the tree includes a root node branching into multiple levels of internal nodes and terminates with a plurality of leaf nodes, the leaf nodes corresponding to the cells in the data cube, the root and internal nodes each having a plurality of child nodes;

the method further includes, for each subset of child nodes y of a node x where the blocks corresponding to the nodes y are within the query region Q, means for identifying the index to a cell with a maximum value among the cells referenced by the subset of nodes, based on the reference arrays Rs; and the means for generating a range max/min result includes:
  (a) means for identifying a node x of the tree where the node x corresponds to a smallest block that includes the query region Q; and
  (b) means for repeatedly reducing the size of the region Q to determine a cell having the range max/min result, based on the cell indexes referenced by the nodes of a sub-tree of the tree, the sub-tree having a root node that is the same as the identified node x.

31. The system as recited in claim 30, wherein:
the means for reducing the size of Q includes:
  (a) means for initializing a variable u with the index of any cell in the query region Q;
  (b) means for determining whether the value of a cell indexed by $x_j$, where $x_j$ is the index stored at node x, is larger than the value of a cell indexed by the variable u and whether the cell indexed by $x_j$ is within the query region Q;
  (c) if the value of the cell indexed by $x_j$ is larger than the value of the cell indexed by u and the cell indexed by $x_j$ is within the query region Q, then means for updating the variable u with the index $x_j$;
  (d) if the value of the cell indexed by $x_j$ is larger than the value of the cell indexed by U and the cell indexed by $x_j$ is outside the query region 0, then for each child node z of node x where the block corresponding to node z intersects with Q, means for recursively operating the means (b)–(e) with node x being substituted by node z; and
  (e) means for returning the value of u as the range-max/min result.

32. The system as recited in claim 25, wherein:
the means for determining the index includes means for identifying, for each block, the indexes of the cells whose values are equal to or greater than those of remaining cells in the block, the identified indexes being in an order; and
the generation of the range max/min result is based on the values of the cells referenced by the ordered indexes.

33. The system as recited in claim 32, wherein:
the means for generating a range max/min result includes:
  (a) identifying a node x of the tree where the node x corresponds to a smallest block that includes the query region Q; and
  (b) repeatedly reducing the size of the region Q to determine a cell having the range max/min result, based on the cell indexes referenced by the nodes of a sub-tree of the tree, the sub-tree having a root node that is the same as the identified node x.

34. A system for performing a range max/min query in a database represented by a d-dimensional array A having a plurality of cells, each cell having a value and identified by an index, the range max/min query corresponding to a region Q of the array A, the system comprising:
  means for precomputing at least one d-dimensional reference array R of the same size as the array A, each member R[i] of R referencing an index j of the array A such that j is closest to i with respect to a predetermined distance function and direction, and referencing an out-of-bound index of array A if no such j exists;
  means for generating a range max/min result from the values of the cells selected from those in the query region Q, based on the precomputed reference arrays Rs.

35. The system as recited in claim 34, wherein the means for generating a max/min result includes:
  means for initializing a variable u with the index of any cell in the query region Q;
  means for traversing a reference array R starting from a member of R corresponding to a cell in the query region Q until all cells in Q have been covered, the coverage being based on the predetermined distance function and direction;
  means for updating the variable u with the index of each cell of R being considered during the traverse of R; and
  means for returning the last value of u as the range max/min result.

36. The system as recited in claim 35, wherein:
the reference arrays R are one-dimensional; and
the means for traversing includes means for traversing the reference array R from a lower bound of the query range until immediately before an upper bound of the query range or the out-of-bound index is found.

* * * * *